United States Patent Office 3,425,668
Patented Feb. 4, 1969

3,425,668
DEVICE FOR AUTOMATIC FEEDING OF SIZE TO AT LEAST ONE SIZING MACHINE
Peter Koenig and Anton Lucian, Arbon, Switzerland, assignors to Paul Koenig, Arbon, Switzerland
Filed Feb. 24, 1966, Ser. No. 529,753
Claims priority, application Switzerland, Feb. 25, 1965, 2,624/65
U.S. Cl. 259—8
Int. Cl. B01f 15/04; G05d 11/02; F16k 37/00
9 Claims

ABSTRACT OF THE DISCLOSURE

A device for automatically feeding size to at least one sizing machine, in which a size boiler adapted to produce basic size of a constant concentration feeds the size to a size regulator which is adapted for thinning the basic size supplied to it from the boiler, thereby forming prepared size of a lower concentration. The size is fed from the regulator to a sizing machine, via a control device, which is operative to deliver a number of consecutive individual charges of prepared size from the regulator to the sizing machine, whereby the latter is continuously kept charged with size.

---

Well proved size boilers for the preparation of size are known. If size prepared in such a boiler can be fed, in a concentration which always remains constant, to one or more sizing machines, then no difficulties arise in the manually controlled machines used at present. If however the product requirements are changed, which owing to the high operational speed of modern sizing machines becomes necessary more often, then it causes a lot of trouble to adjust the boiling of the size to the new concentration required. This change-over often entails loss of size already prepared and the time needed for the change-over is very considerable.

Attempts have already been made to make size boilers which will operate automatically by an arrangement in which the starch meal and other solid additives which are dissolved in water in the boiler are fed in continuously measured amounts to the boiler and the prepared size is continuously fed therefrom to one or more sizing machines. Such automatic devices are very complicated and subject to breakdown and do not permit quick and loss-free change-over to other concentrations of size due to the relatively large amount of size contained in the boiler.

An object of the present invention is to eliminate these disadvantages.

The invention contemplates a device for the automatic feeding of size to one or more sizing machines. This device is characterized in that an automatic size regulator is arranged between a size boiler, in which a basic size of constant concentration is produced, and each sizing machine, and has a container in which the basic size is thinned with hot water to a prepared size of lesser concentration adjustable in the regulator, the regulator delivering to the sizing machine in sequence individual charges of prepared size corresponding to the amount of size used until the regulator's container is substantially empty, where-upon this container is refilled with basic size and hot water in a ratio corresponding to the required concentration of the prepared size and the delivery of the size begins again.

Figure 1:
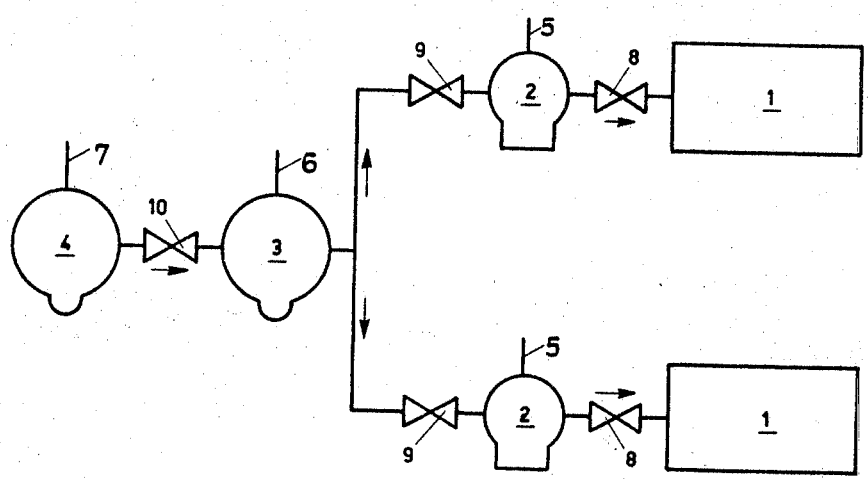
Figure 2:
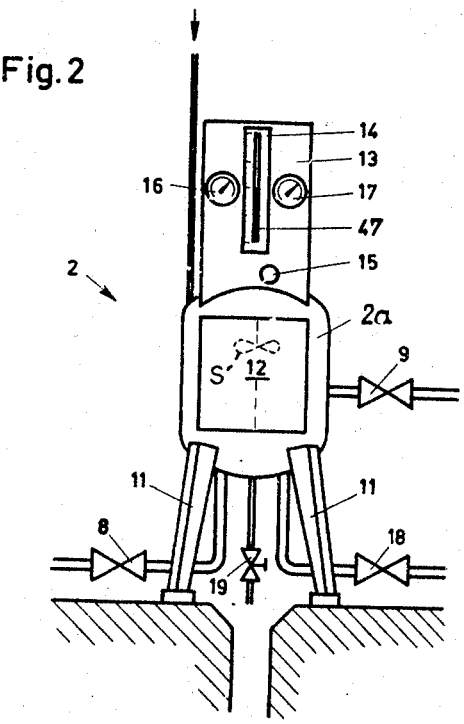
Figure 3:
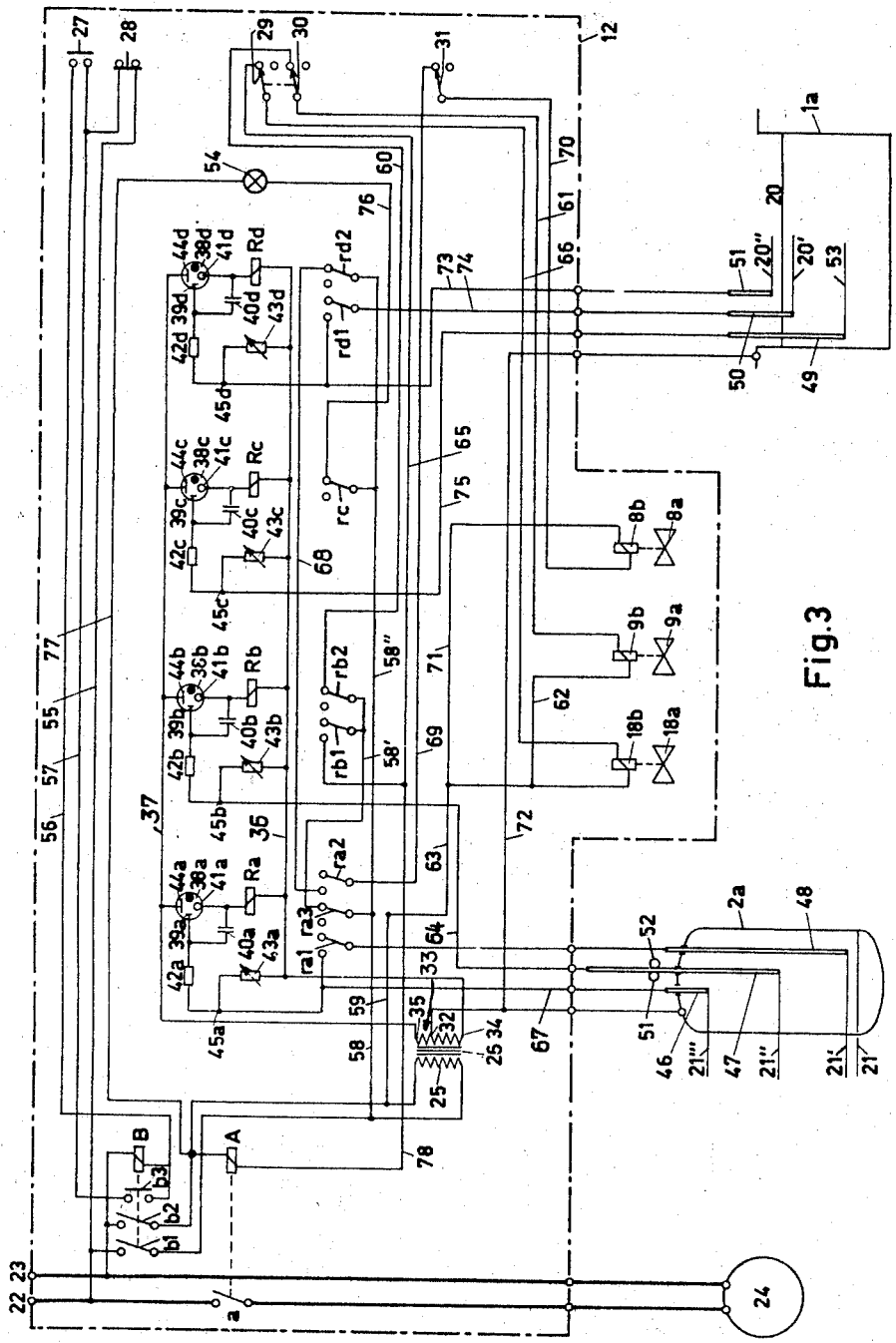

An embodiment of the present invention will now be described, by way of example, with reference to the accompanying drawing, in which:

FIG. 1 is a block diagram of a device according to the invention, having two size-regulators, FIG. 2 is a schematic elevation of an automatic size-regulator for use in devices according to the invention, and, FIG. 3 is a wiring diagram of the size-regulator shown in FIG. 2.

FIG. 1 shows a device for the automatic feeding of two sizing machines 1, to which the size is fed by means of two automatic sizer regulators 2, one for each machine. Each size regulator 2 solves, in a manner explained in greater detail later on, the problem of feeding to the corresponding sizing machine 1, according to its requirements, a prepared size of any desired concentration between 0 and say 20% produced in the size-regulator from a basic size having a concentration of, for example 20%. The basic size is delivered to the size-regulator from a size reservoir 3. The basic size is produced in an automatic size boiler 4 of known type. A size boiler of a type similar to the size boiler 4 is preferably used for the size reservoir 3 so that in the case of failure of the boiler 4 a reserve boiler is available. The regulators 2, the reservoir 3 and the boiler 4 comprise closed containers which are connected to a source of compressed air by means of pipes 5, 6 and 7 and pressure-reduction valves (not shown). The arrangement is such that the air pressure in the boiler 4 is higher than that in the reservoir 3 and the air pressure in the latter is higher than that in the regulator 2. As is known, the size in the sizing machine 1 is located in open troughs through which the warp threads for sizing are drawn; consequently, the troughs are under atmospheric pressure. Valves 8, 9, and 10 are disposed between the pieces of apparatus 1, 2, 3 and it is apparent that when valve 10 is open the basic size is forced by the compressed air from the boiler 4 into the reservoir 3, when one of the valves 9 is open the basic size is forced from the reservoir 3 into the regulator 2 concerned and, when one of the valves 8 is open the prepared size from the regulator 2 is forced into the corresponding sizing machine 1. Of course, the two valves 8 and the two valves 9 can be open at the same time. Conveying of the size under the influence of compressed air is very advantageous as pumps are often deleteriously affected by residues of size which become crusted on them. Compressed air is superior to the use of steam under pressure for moving the size as the concentration of the size conveyed is altered by condensation of the steam.

It is obvious that in the device shown in FIG. 1 three or more groups of regulators and sizing machine could be connected to the reservoir 3 without any difficulty.

As shown in FIG. 2, each automatic size regulator 2 has a closed container 2a which rests on legs 11 and carries at its front a switch box 12 in which electrical control appliances for the regulator are disposed. Switches, not shown in FIG. 2 are mounted on the outside of the switch box 12 and serve to switch the regulator 2 as a whole on or off and for the adjustment of special operating conditions as will be described later with reference to FIG. 3. A scale 14, on which the desired concentration of the prepared size can be adjusted by means of a rotary adjustment knob 15, is mounted on a board 13 which is secured to the container 2a. Two manometers 16 and 17 are also mounted on the board 13, one of which indicates the air pressure in the container 2a, for example 0.8 atm., and the other air pressure for example 1.9 atm. which is available, in pipes not shown, to operate the valves 8 and 9.

A pipe not shown in FIG. 1, for supplying the hot water is connected to the container 2a and a further compressed air operated valve 18 is provided in this pipe. A manual valve 19 serves to empty the container 2a completely. A stirring mechanism S is disposed in the container 2a and is shown in dotted outline.

The valves 8, 9 and 18 are associated with servo-valves 8a, 9a, and 18a, disposed in the switch box 12 and shown in FIG. 3. The servo-valves 8a, 9a and 18a are electro-magnetic valves whose windings are marked 8b, 9b, and 18b in FIG. 3. If one of these windings, for example 8b, is energized then the corresponding servo-valve 8a opens which then feeds compressed air via a pipe (not shown) to the pneumatic valve 8 thus opening the valve 8.

In principle, to achieve the same result the valves 8, 9 and 18 could themselves be constructed as the electro-magnetic valves and could have added to them the windings 8b, 9b, and 18b, seeing that the use of the servo-valves 8a, 9a, and 18a is preferred purely for reasons of dimension.

The following effect is produced by the automatic control devices contained in the box 12.

When the level 20 of the prepared size in the trough 1a of the sizing machine 1 falls below a minimum position $20^1$, then the valves 8 and 8a should open so that due to the air pressure in the container 2a of about 0.8 atm. prepared size is delivered from the container 2a into the trough 1a. The delivery of the prepared size should occur when the level 20 has reached a maximum position 20″. For example, in raising the level from 20′ to 20″ 10 litres of prepared size, out of a total of about 50 litres in the container 2a, could be delivered to the trough 1a. When about 10 litres of size in the trough 1a have been used, the operation is repeated until the container 2a is nearly empty. If the liquid level in the container 2a falls below a lower level 21′, the valve 9 or 9a should open and basic size should flow into the container 2a until a "mixture portion," 21″, adjustable by means of the adjustment knob, 15, is reached; then the valve 9 or 9a should close and the valve 18 or 18a open to let in hot water. When the upper level 21″ is reached the valve 18 or 18a should close. During the short time in which hot water is fed to the container 2a in the manner described, the stirring mechanism should operate in order to produce an intrusive mixing of the basic size and the hot water.

During the filling and mixing period, the valve 8 may not be opened even if the level in the trough 1a just at that time falls below the desired minimum position, which is not at all critical for the operation of the sizing machine.

The circuit which ensures that this requirement is met will be described below and it will be shown that it in fact fulfils the necessary requirements.

Two inlet terminals 22 and 23 are attached to an electrical voltage source for example normal alternating current of 220 v. A safety switch A having a movable contact a serves to control a motor 24 adapted to drive the stirring mechanism. A main relay B has three movable contacts b1, b2 and b3. The contacts of all relays contained in the circuit are shown in the position corresponding to non-energization of the relays. If the relay B is energized its contacts b1 and b2 connect the inlet terminals 22 and 23 to the primary winding 25 of a transformer 26, while its contact b3 serves as a holding contact. For switching on and switching off the regulator, a push button switch 27 normally open and a push button switch 28 normally closed are provided. A double pole switch having two contacts 29 and 30 is provided so that by opening of the same, the supply of basic size and hot water can be prevented even if the level of the prepared size in the trough 1a falls below the normal minimum level 20′. This is useful if the work of the sizing machine is practically at an end and it would be wasteful to refill the regulator container 2a: a further slight fall in the level 20 can be accepted at this stage without worry. A further switch 31 allows delivery of prepared size to the trough 1a to be stopped if this is temporarily desired for any reason, for example during adjustment of the sizing machine 1.

The transformer 26 has a secondary winding 33 provided with a divider tap 32. Between the end terminals 34 and 35 of the winding 33 a voltage equal to the input of 220 v. is present while between the end terminal 34 and the tap 32 a voltage of 165 v. is produced. The end terminal 34 is connected to a conductor 36 and the end terminal 35 to a conductor 37. Four cold cathode tubes 38a–38d are connected in parallel between the conductors 36 and 37 together with relays Ra–Rd. The priming electrodes 39a–39d of the tubes 38a–38d, are connected via condensors 40a–40d with the cathodes 41a–41d of the tubes and via high resistances 42a–42d and variable resistances 43a–43d to the conductor 36 while the anodes 44a–44d are connected to the conductor 37. The tubes 38a–38d are conductive when 220 v. is present between anode and cathode and 165 v. between priming electrode and cathode.

The relay Ra has two work contacts ra1 and ra2 as well as a neutral contact ra3. The relay Rb has a work contact rb1 and a neutral contact rb2. The relay Rc has only a neutral contact rc and the relay Rd again has a work contact rd1 and a neutral contact rd2. The contacts of the four relays Ra–Rd and the points 45a–45d at which the resistances 42a–42d are connected with the resistances 43a–43d are also connected in the manner shown in the drawing to the windings 8b, 9b and 18b of the servo-valves 8a, 9a and 18a to the switches 29, 30 and 31 and to rod-shaped electrodes 46, 47, 48 and 49, 50, 51, which are arranged respectively in the container 2a and in the trough 1a. The electrodes 46–51 which preferably all consist of the same material are electrically insulated from the container 2a. The container 2a and the trough 1a are electrically connected to the tap 32 of the transformer secondary windings 33. The lower end of the electrode 46 defines the upper boundary 21‴, the lower end of the electrode 47 the mixing position 21″ and the lower end of the electrode 48 the lower boundary position 21′. The electrode 47 projects upwardly far out of the container 2a and is clamped between two fixed rollers 51 and 52 arranged behind the board 13 (FIG. 2). One of the rollers is mounted on the axle (not shown) at the adjustment knob 15 so that by rotating this knob the electrode 47 can be raised or lowered. The upper part of the electrode 47 is visible adjacent the scale 14 on which the upper end of the electrode marks the concentration of the prepared size.

The lower end of the electrode 49 defines the danger level 53 in the trough 1a below which a signal lamp 54 comes on or some other alarm device comes into operation. The lower ends of the electrodes 50 and 51 define the normal minimum position $20^1$ and the maximum position 20″ for the prepared size in the trough.

The manner in which the device just described operates will be set out below in detail.

For the sake of simplicity, the starting condition will be assumed to be that in which the regulator 2 is switched off but the container 2a still retains some prepared size say about 10% of the maximum, that is up to the level 21 shown lying just below the lower boundary position 21′. To facilitate the description of the circuit, certain conductor wires are provided with reference numbers 55–78.

When the switch button 27 is pressed, the circuit 22, 55, 28, 27, 56, B, 23 is closed and consequently the relay B is energized which after release of the button 27 remains energized via the holding circuit 22, 55, 28, 57, b3, B, 23. The transformer 26 is now energized via the contacts b1 and b2 and a voltage of 220 v. is present between the conductors 36 and 37 and a voltage of 165 v.

is present between the tapping 32 and the conductor 36. The input voltage 220 v. is also applied across the two wires 58 and 59 so that the energizing circuit 58, ra3, 58¹, rb2, 60, 30, 61, 9b, 62, 63, 59 of the winding 9b of the servo valve 9a is closed and consequently the basic size valve 9 is opened. Basic size from the boiler 4 now flows into the containers 2a up to the mixing position 21″, because the immersion of the electrode 48 does not affect the inflow since the contact ra1 connected to this electrode is in its neutral position.

When the basic size reaches the mixing position 21″, the priming circuit 32, 2a, 47, 64, 45b, 42b, 39b, 41b, Rb, 36, 34 of the tube 38b is closed whereupon the electrical potential of 165 v. applied between the priming electrode 39b and the cathode 41b, of the tube 38b ignites the tube. Current now flows in the energizing circuit 35, 37, 44b, 41b, Rb, 36, 34 of the relay Rb which reacts and changes over its contacts rb1 and rb2.

When contact rb2 is moved, the energizing circuit of winding 9b is interrupted and consequently the valve 9 controlling the flow of basic size is closed. On the other hand, on the making of the contact rb1 the energizing circuit 58, ra3, 58′, rb1, 65, 29, 66, 18b, 63, 59 of the winding 18b of the servo-valve. 18a is completed and consequently the hot water valve 18 is opened.

Hot water now flows into the container 2a until the upper level 21‴ is reached. The liquid then closes the priming circuit 32, 2a, 46, 67, 45a, 42a, 39a, 41a, Ra, 36, 34 of the tube 38a. When the tube 38a conducts, the energizing circuit 35, 37, 44a, 41a, Ra, 36, 34 of the relay Ra is completed and the relay reacts and changes over its contacts ra1, ra2 and ra3. When contact ra3 changes over, 58′ becomes without current, i.e. the energizing circuit of winding 18b is interrupted and consequently the hot water valve 18 is closed. On the other hand, the changed over contact ra1 now switches the electrode 48 parallel to the electrode 46 so that on later removal of size from the container 2a the primary circuit of the tube 38a is not interrupted as long as the electrode 48 dips into the liquid. Furthermore the changed over contact ra2, closes the exciter circuit 58, 58″, rd2, 68, ra2, 69, 31, 70, 8b, 71, 59 of the winding 8b of the servo-valve 8a so that the prepared size valve 8 is opened. As long as the container 2a is not filled and contact ra2 is thus not made, the prepared size valve 8 cannot be opened. The prepared size flows from the container 2a into the trough 1a provided that the level 20 in the latter lies below the maximum position 20″. If the level 20 reaches the maximum position 20″, the electrode 51 is put into electrical contact with the trough 1a, through the size and the priming circuit 32, 72, 1a, 51, 73, 45d, 42d, 39d, 41d, Rd, 36, 34 of the tube 38d is completed with the result that the tube ignites and the relay Rd reacts.

By the change over of contact rd2, or Rd the energizing circuit of the winding 8d is interrupted and consequently the prepared size valve 8 is closed. At the same time the electrode 50 is switched parallel to the electrode 51 by means of the contact rd1, and the wire 74 so that the priming circuit of the tube 38d remains closed as long as the electrode 50 dips into the size. However, as soon as the level 20 falls below the minimum position this priming circuit is interrupted, the tube 38d becomes non-conductive and the relay Rd cuts out so that rd1, and rd2 return to the position shown in FIG. 3. This means that the prepared size valve 8 is again opened and a further small charge of about 10 litres of prepared size flows into the trough 1a until the maximum position 20″ is again reached whereupon the operation as described is repeated.

According to the use made of the sizing machine 1, fiev 10 litre charges of prepared size are delivered by the regulator 2 in the manner described so that finally the level 21 in the container 2a falls below the lower 21¹. The joining circuit of the tube 38a, is thus interrupted and this tube becomes non-conductive so that the relay Ra, cuts out and its contacts ra1–ra3 return to the position shown. The energizing circuit of the winding 9b of the servo-valve 9a is closed by the contact ra3, so that the basic size valve 9 opens. Since the relay Rb has cut out because the level 21 has fallen below the mixing position 21″, the container 2a is now filled in the manner already described first with basic size and then with hot water in the ratio determined by the adjusted position of the electrode 47 whereupon five charges of prepared size are delivered in turn to the sizing machine and so on.

If the normally closed switch 31 is opened, then the energizing circuit of the winding 8b is permanently interrupted with the result that the prepared size valve 8 can no longer open. It is also possible—as already explained above—to stop, in this way, the delivery of the prepared size to the sizing machine 1 at will. If the normally closed double pole switch 29, 30, is opened, then the energizing circuit of the windings 18b, and 9b are permanently interrupted with the result that the hot water valve 18 and the basic size valve 9 can no longer open. This feature is—as has been explained—used to prevent further filling of the container 2a, if the work to be completed by the sizing machine 1 is nearly finished. If too low an estimate of the amount of size required to finish the work has been made or if the double switch 29, 30, has inadvertently been left open, so that the level of the size in the trough 1a, falls below the danger level 53, then—as already explained—the signal lamp 54 will light up. For this purpose the tube 38c, is provided with a relay Rc in series with it. The manner of operation of the relay Rc will now be explained.

As soon as the transformer 26 is energized in the manner described, the priming circuit 32, 72, 1a, 49, 75, 45c, 42c, 39c, 41c, Rć, 36, 34 of the tube 38c is completed so that the relay Rc, reacts and changes over its contact.

An alarm circuit b1, 58, 58″, rc, 76, 54, 77, b2 passing through the signal lamp 54 is thus interrupted. Now if the size level 20 falls below the danger position 53, then the priming circuit of the tube 38c is interrupted, the tube 38c becomes non-conductive the relay Rc cuts out and the contact rc returns to the position shown in FIG. 3 in which the alarm circuit is closed and the signal lamp 54 lights up.

When the relay Rb reacts not only is the energizing circuit of the winding 18b completed by means of the contact rb1, thus opening the hot water valve 18 as previously described, but at the same time the energizing circuit b1, 58, ra3, 58′, rb¹, 78, A, b2, of the switch A is completed and this closes its contact a. By this, the motor 24 is set in operation which drives the stirring mechanism contained in the container 2a. As long as the hot water flows, it is consequently mixed in a very intensive manner with the basic size. As soon as the level 21 reaches the upper boundary position 21‴ and the tube 38 is thus ignited, the relay Ra reacts and the energizing circuit of the switch A is interrupted by the changeover of the contact ra3 so that the motor 24 or the stirring mechanism is stopped.

To switch off the regulator, the cut off button 28 has to be operated whereby the holding circuit of the relay B is interrupted so that the latter cuts out and due to the opening of its contacts b1, and b2, all the described circuits become non-conducting and the system returns to the position shown in FIG. 3.

It was set out as a condition as the beginning of the functional description, that on switching in the regulator 2, prepared size of at least 10% concentration should be in the lowest part of the container 2a. If the electrode 47 is adjusted on the scale 14 to a prepared size of 8% concentration then on first filling the container 2a, the concentration will be a little higher than 8%. This slight difference will completely disappear during the following fillings. If the container 2a is quite empty when the regulator 2 is switched on, then the lower part of the container fills with basic size so that the starting error is somewhat greater which however likewise quickly disappears. Furthermore it is possible to fill into the lowest portion of the container, by manual operation of the valves 9 and 18, for example by means of manually operated servo-valves, a mixture of basic size and hot water of the desired concentration.

Automatic control of the size boiler 4 is known and it offers no difficulties to see to it that the reservoir 3 is always sufficiently full to allow topping of the regulator 2. As the concentration of basic size remains constant it is not to be feared that too much basic size is produced. The adjustment of concentration of the prepared size to the desired value when some is required in the goods to be treated in one of the sizing machines 1 is effected by means of a single handle on the adjustment knob 15 of the regulator concerned.

Preferably, the system described is completed by several signalling circuits having different colored signal lamps attached to the valves, 8, 9, and 18, and show upon lighting which related valve is open. Further, a change-over switch is conveniently provided, which allows automatic excitation of the switch A to be presented and enables this switch to be switched on and off by hand in order to put the stirring mechanism into operation irrespective of the stage reached in the operational cycle of the regulator 2. These additions to the system are very easy to carry out and do not require to be shown on the drawing. As a variant of the functions of the valves 9 and 18, the order of these valves in the cycle could be interchanged i.e. by filling the container 2a first with hot water and then with basic size. The device described has very great advantages over the size feeding devices so far in normal use. More particularly, it is not necessary to arrange the size boiler so that it should produce the prepared size of the concentration desired in each case. The boiler produces a basic size of a constant concentration, the production of which can very easily be automatically controlled. Thus errors in the calculation of the components of the size and in the operation of the boiler are unlikely to occur. In addition to this, the current and heating costs are decreased and the device can be operated by assistants who at the same time can undertake other work. The loss of size on change-over of production is reduced to a minimum because the basic size is immediately usable for the new production.

Further, the sizing machines do not have to remain stopped for an unnecessary length of time until the desired size is prepared as the automatic size regulator delivers this size immediately. Practical tests have shown that the error in the concentration of the prepared size is less than ±0.5%.

We claim:

1. A device for automatic feeding of size to at least one sizing machine, said device comprising: a size boiler adapted to produce basic size of a constant concentration, at least one size regulator connected to said size boiler and adapted for effecting thinning of basic size supplied to it from said boiler thereby forming prepared size of a lower concentration, means for controlling delivery of prepared size from said regulator to the sizing machine, said means being adapted to deliver a number of consecutive individual charges of prepared size from said regulator to keep the sizing machine charged with size, means for controlling charging of basic size and water to said regulator to give prepared size of a desired adjustable concentration, the latter means including a valve controlling supply of water to said regulator and a valve controlling supply of basic size to said regulator from said boiler, first, second and third electrodes arranged within said size regulator and electrically insulated therefrom, said first electrode defining a lower level in said regulator, said second electrode defining an upper level therein and said third electrode defining an intermediate level between said upper and lower levels, said intermediate level being adjustable by movement of said third electrode, electrically conducting material comprising said size regulator, and electrical circuits controlling operation of said valves and including said first, second and third electrodes and said electrically conducting material of the size regulator, said circuits being arranged to initiate flow through one of said valves when the electrical connection from said first electrode to said electrically conducting material through liquid in said regulator is broken and to stop such flow and initiate flow through the other of said valves when electrical connection from said third electrode to said electrically conducting material is made and to stop flow through said other valve when electrical connection from said second electrode to said electrically conducting material is made.

2. A device according to claim 1 wherein said boiler includes a closed container and said regulator, also includes a closed container, said containers being adapted for connection to a source of compressed air to enable basic size to be blown from the boiler to the regulator and to enable prepared size to be blown from the regulator to the sizing machine.

3. A device according to claim 2 and further comprising,
   (a) electrical relays controlling said valves,
   (b) cold cathode tubes connected in series with said relays, and
   (c) priming circuits for said cold cathode tubes connected in said electrical control circuits.

4. A device according to claim 3 and further comprising,
   (a) a stirrer in said size regulator,
   (b) an electric motor for said stirrer,
   (c) an electrical control circuit for said motor,
   (d) a switch in said control circuit, said switch being controlled by one of said relays to operate said stirrer when the liquid level in the size regulator is rising from said intermediate level to said upper level.

5. A device according to claim 3 further comprising manually operated switches connected in said control circuits controlling the valves of the device and enabling said valves to be closed and maintained closed.

6. A device according to claim 5 wherein said control circuits maintain said valve between the size regulator and the size trough closed during filling of the size regulator.

7. A device according to claim 1, wherein said third electrode comprises a bar, said device including means adjustably supporting said bar in a vertical position and a scale against which the upper end of the bar is located and on which the position of said upper end indicates the concentration of the size prepared in the size regulator.

8. A device according to claim 1, said device further comprising, a size trough in the sizing machine, said means which controls delivery of prepared size from said regulator comprising a valve connected between the size regulator and said size trough and controlling flow of prepared size from said regulator to said trough, two electrodes in said size trough and defining therein a normal minimum level for prepared size and a maximum level for prepared size, electrical control circuits including said first and second electrodes connected to control the last said valve, said size trough comprising an electrically conducting material connected in said control circuits and enabling electrical connection to be made or broken in the circuits according to the level of liquid in the said trough.

9. A device according to claim 8, wherein
   (a) a third electrode projects deeper into the size trough than said other two electrodes,
   (b) an alarm apparatus,
   (c) an electrical control circuit for said alarm apparatus and including said electrically conducting material of said size trough and said third electrode, said circuit being arranged to energize said alarm apparatus when the electrically conducting path between the third electrode and said electrically conducting material is broken.

References Cited

UNITED STATES PATENTS

| | | | |
|---|---|---|---|
| 2,617,743 | 11/1952 | Grimm | 117—156 X |
| 2,849,015 | 8/1958 | Colson | 137—98 |
| 3,131,710 | 5/1964 | Ludwig et al. | 137—101.25 X |
| 3,255,040 | 6/1966 | Huber et al. | 117—156 X |
| 3,292,650 | 12/1966 | Bird et al. | 137—101.25 |

WILLIAM F. O'DEA, *Primary Examiner.*

D. J. ZOBKIW, *Assistant Examiner.*

U.S. Cl. X.R.

127—28; 137—101.25, 558